UNITED STATES PATENT OFFICE.

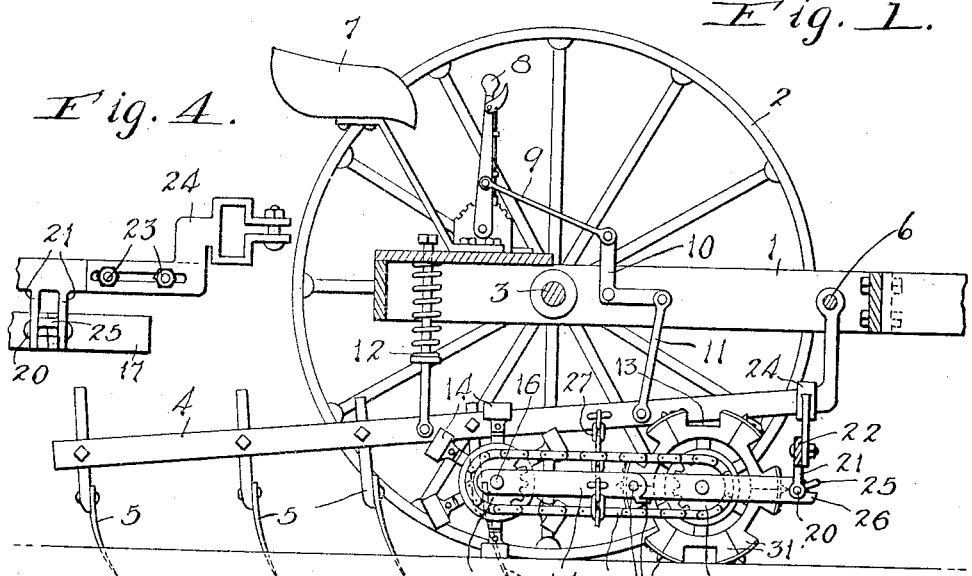

JC. CHRISTON GUNN, OF WALNUT SPRINGS, TEXAS.

COTTON-CHOPPER.

1,223,868.  Specification of Letters Patent.  Patented Apr. 24, 1917.

Application filed December 7, 1916. Serial No. 135,637.

*To all whom it may concern:*

Be it known that I, Jc. CHRISTON GUNN, a citizen of the United States, residing at Walnut Springs, in the county of Bosque, State of Texas, have invented new and useful Cotton-Choppers; and I do hereby declare the following to be a full, clear, and exact description of the invention, such as will enable others skilled in the art to which it appertains to make and use the same.

The present invention relates to certain new and useful improvements in the construction of machines for thinning young plants, such machines being more commonly employed in the cultivation of cotton, and being popularly termed cotton choppers, the object of the invention being to provide a machine of this character which embodies novel features of construction whereby it can be utilized in connection with a cultivator for simultaneously thinning and cultivating young cotton plants.

Further objects of the invention are to provide a machine for thinning young plants which is comparatively simple and inexpensive in its construction, which can be attached to and used in connection with practically any of the conventional forms of wheel cultivators, which can be adjusted to increase or decrease the distances between the stands of young plants, and which operates in an effective manner to prevent the young plants which are left standing from being covered with dirt from the cultivator shovels.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which :—

Figure 1 is a longitudinal sectional view through a cultivator which is provided with a cotton thinning device constructed in accordance with the invention.

Fig. 2 is an enlarged side elevation of the cotton thinning device, portions being broken away and shown in section to illustrate more clearly certain details of construction.

Fig. 3 is a top plan view of the cotton thinning device.

Fig. 4 is a detail view of one end of the cross bar to which the cotton thinning device is attached.

Corresponding and like parts are referred to in the following description and indicated in all the views of the drawings by the same reference characters.

For the purpose of illustration the invention is shown as employed in connection with a conventional form of wheeled cultivator, including a main frame 1 and wheels 2 which are mounted upon an axle 3. A trailing cultivator beam 4 is arranged upon each side of the machine, said beams carrying the conventional cultivator shovels 5 and having the forward ends thereof pivotally connected at 6 to the main frame 1. A seat 7 is provided for the operator, and hand levers 8 which are mounted adjacent to the seat 7 are operatively connected to the cultivator beams for the purpose of raising and lowering the same. This may be done in any conventional manner, although in the present instance forwardly extending links 9 connect the hand levers to bell cranks 10 which are in turn connected by downwardly extending links 11 to the cultivator beams 4. If desired, spring plungers 12 may act upon the cultivator beams to hold the cultivator shovels to their work. This is all of the conventional and well-known construction, and no claim to novelty is based thereon.

The plant thinning mechanism includes a forward drum A provided with peripheral plant receiving pockets 13, and a rear wheel B provided with correspondingly arranged plant receiving cups 14, the drum and wheel being mounted to move in synchronism so that the cups 14 will cover the young plants which are left standing by the pockets 13 of the drum A, the intervening plants being crushed by the portions of the periphery of the drum between the pockets 13. On the drawings the drum A and wheel B are shown as mounted upon the respective transverse shafts 15 and 16 which connect the side pieces of a frame 17, sprocket wheels 18 being rigidly fitted upon the respective shafts and connected by a chain 19 to insure that the drum and wheel will move in synchronism.

The forward end of the frame 17 is pivotally connected at 20 to a pair of arms 21 which project downwardly from a cross bar 22, the extremities of the cross bar having adjustable pin and slot connections 23 with clamping elements 24 which are adapted to engage the cultivator beams 4, thereby mounting the cotton thinning device between the cultivator beams with the wheel B arranged approximately between the forward cultivator shovels 5. The pivot arms 21 of the cross bar 22 are shown as provided with a looped stop 25 which is adapted to be engaged by a stop finger 26 upon the pivot end of the frame 17 to limit the downward swinging movement of the said frame. Flexible link members such as the chains 27 may also connect the sides of the frame 17 to the cultivator beams 4 for the purpose of insuring that the plant thinning attachment will be swung upwardly into an inoperative position when the cultivator shovels are raised, and relieving the pivot joint at the forward end of the frame of all unnecessary strain.

If desired, mud hooks or lugs 28 may project from the periphery of the frame A to insure a continuous and uninterrupted rotation thereof as the cultivator is advanced across the field. As this drum rotates, those young plants which are received within the pockets 13 will be uninjured and remain standing, while the intervening young plants will be crushed by the solid portions of the surface of the drum. Those of the young cotton plants which are left standing by the drum A will be successively received within the cups 14 of the wheel B so that they will not be covered by the dirt from the cultivator shovels 5, although the crushed plants will be covered with loose dirt and all possibility of their subsequently springing up thereby avoided.

Both the drum A and wheel B are expansible, thereby enabling the distance between the stands of young plants to be increased or decreased as desired. The drum A includes a hub member 29 which has a series of radial arms 30 mounted therein, said radial arms carrying the segmental blocks 31 which have the pockets 13 therein, and being adapted to be clamped in any adjusted position by means of bolts 32 which are movable within radial slots 33 in the hub member. When the radial arms 30 are moved inwardly to the limit of their movement the segmental blocks 31 fit against each other and the plant receiving pockets 13 are brought as closely together as possible, thereby providing for a minimum distance between the stands of young plants. By moving the radial arms 30 outwardly the peripheral distance between the pockets 13 will be increased, thereby providing for an increased distance between the stands of young plants. The outer face of each of the segmental blocks 31 is provided at one side thereof with a laterally projecting plate 34 which overlaps and slidably engages the outer face of the next adjacent segmental block. These plates 34 serve to bridge the spaces between the segmental blocks 31 when the latter are moved outwardly to increase the effective size of the drum, and a solid plant crushing surface is thus provided at all times between the adjacent plant receiving pockets 13.

The cup carrying wheel B is expansible in a somewhat similar manner, since the effective size thereof must correspond exactly with the effective size of the drum A. This wheel B includes a hub member 35 within which a series of radial spokes 36 are slidably mounted, said spokes carrying the cups 14 at the outer ends thereof, while the inner ends thereof are adapted to be clamped in different adjusted positions by means of the clamping bolts 37 which are slidable within radial slots 38 in the hub. The spokes 36 can thus be moved in and out and the adjustment of the drum A and wheel B made to correspond with each other. The chain and sprocket connection between the drum and the wheel insures a synchronous movement of the two members, and it will be understood that the drum A operates to crush all of the young plants with the exception of those which are received within the pockets 13, and that the crushed plants are subsequently covered with loose earth from the cultivator shovels 5, while those plants which were left standing by the drum are received within the cups 14 of the wheel B and prevented from being covered with the loose earth. In this manner the cotton may be simultaneously thinned and cultivated without danger of choking or crushing the stands of young plants with loose soil. The cups 14 are shown as provided at their bases with ears 38 which are pivotally connected at 39 to the ends of the radial spokes 36. The cups thus have a limited swinging movement which enables them to fit squarely upon the ground when in position to fit over the young plants. The side pieces of the frame 17 are also shown as formed in sections which are hingedly connected at 40, such a construction enabling both the wheel and the drum to remain in engagement with the ground at all times, even if the surface of the ground may be rough. Stops 41 at the hinged joints 40 prevent the side pieces from sagging at the joints during the operation of the machine.

Having thus described the invention, what I claim as new and desire to secure by Letters Patent, is:—

1. In a machine for thinning young plants, the combination with a cultivator, of a plant crushing drum provided with peripheral plant receiving pockets for preserving stands of young plants, and a wheel trailing the drum and provided with cups arranged to fit over the stands of young plants and prevent them from being covered by the cultivator.

2. In a machine for thinning young plants, the combination with a cultivator, of a plant crushing drum provided with peripheral plant receiving pockets adapted to preserve stands of young plants, a wheel trailing behind the drum and provided with cups positioned according to the pockets of the drum, and means for causing the drum and wheel to rotate in synchronism, the cups of the wheel being successively positioned over the stands of young plants to prevent them from being covered by the cultivator.

3. In a machine for thinning young plants, the combination with a cultivator, of a plant crushing drum provided with peripheral plant receiving pockets adapted to preserve stands of young plants, a wheel trailing behind the drum and provided with cups adapted to fit over the stands of young plants to prevent them from being covered by the cultivator, mud hooks upon the drum, and gearing between the drum and wheel for causing them to rotate in synchronism.

4. In a machine for thinning young plants, the combination with a cultivator, of an expansible plant crushing drum provided with peripheral plant receiving pockets for preserving stands of young plants, the peripheral distance between the pockets being varied by expanding and contracting the drum, and an expansible wheel trailing behind the drum and carrying cups positioned according to the pockets of the drum, the wheel being adapted to be adjusted in a manner corresponding to that of the drum and the cups thereof being arranged to fit over the stands of young plants and prevent them from being covered with soil from the cultivator.

5. In a machine for thinning young plants, the combination with a cultivator, of a plant crushing drum having the periphery thereof formed of a series of segmental blocks, said blocks being movable in and out to vary the effective size of the drum and being provided with plant receiving pockets adapted to preserve stands of young plants, and means trailing the crushing drum for preventing the stands of young plants from being covered with soil from the cultivator.

6. In a machine for thinning young plants, the combination with a cultivator, of a plant crushing drum having the periphery formed of a series of segmental blocks which are movable in and out to vary the effective size of the drum and which are provided with plant receiving pockets adapted to preserve stands of young plants, each of the segmental blocks carrying a plate which overlaps the next adjacent segmental block to bridge the space between the blocks when the latter are expanded, and means trailing behind the drum for preventing the stands of young plants from being covered with soil from the cultivator.

7. In a machine for thinning young plants, the combination with a cultivator, of a plant crushing drum having the periphery thereof formed of a series of segmental blocks which are movable in and out to vary the effective size of the drum and which are provided with plant receiving pockets to preserve the stands of young plants, a wheel trailing behind the drum and including a hub provided with radially disposed arms which carry cups at their outer ends and are adjustable in and out upon the hub to vary the effective size of the wheel, and means for causing the drum and wheel to rotate in synchronism, the cups of the wheel being adapted to fit over the stands of young plants to prevent them from being covered with loose earth from the cultivator.

In testimony whereof I have signed my name to this specification in the presence of two subscribing witnesses.

JC. CHRISTON GUNN.

Witnesses:
T. E. ROBBINS,
P. G. GUNN.

Copies of this patent may be obtained for five cents each, by addressing the "Commissioner of Patents, Washington, D. C."